United States Patent
Favero et al.

(10) Patent No.: US 12,463,737 B1
(45) Date of Patent: Nov. 4, 2025

(54) DETERMINING PERFORMANCE IMPACT CAUSED BY TROPOSPHERIC DUCTING

(71) Applicant: Nokia Solutions and Networks Oy, Espoo (FI)

(72) Inventors: Daniel Favero, Bellevue, WA (US); Jonathan Gross, Gilbert, AZ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/196,995

(22) Filed: May 2, 2025

(30) Foreign Application Priority Data

May 6, 2024 (FI) ..................................... 20245559

(51) Int. Cl.
*H04B 17/309* (2015.01)
*H04L 1/00* (2006.01)
*H04L 5/14* (2006.01)
*H04W 48/20* (2009.01)

(52) U.S. Cl.
CPC ......... *H04B 17/346* (2023.05); *H04L 1/0003* (2013.01); *H04L 5/1469* (2013.01); *H04W 48/20* (2013.01)

(58) Field of Classification Search
None
See application file for complete search history.

(56) References Cited

U.S. PATENT DOCUMENTS

| | | |
|---|---|---|
| 2009/0274204 A1* | 11/2009 | Chen .................. H04L 27/2601 375/228 |
| 2014/0056190 A1 | 2/2014 | Qian et al. |

(Continued)

FOREIGN PATENT DOCUMENTS

| | | |
|---|---|---|
| CN | 114257319 A | 3/2022 |
| WO | 2023/007420 A1 | 2/2023 |

OTHER PUBLICATIONS

"3rd Generation Partnership Project; Technical Specification Group Radio Access Network; Study on remote interference management for NR (Release 16)", 3GPP TR 38.866, V16.1.0, Mar. 2019, pp. 1-31.

(Continued)

*Primary Examiner* — Hong S Cho
(74) *Attorney, Agent, or Firm* — Nokia Technologies Oy

(57) ABSTRACT

Disclosed is a method comprising collecting training data comprising radio measurement information and one or more performance metrics associated with a plurality of cells; determining, based on the radio measurement information comprised in the training data, an operational received interference power value per a cell of the plurality of cells; determining, based on additional radio measurement information of the cell, a deviation of the cell from the operational received interference power value; determining, based at least on the radio measurement information and the one or more performance metrics of the cell, a vulnerability threshold above which a performance of the cell is impacted by remote interference caused by tropospheric ducting; comparing the deviation of the cell to the vulnerability threshold; and determining, based at least on the comparison, whether the performance of the cell is impacted by the remote interference caused by the tropospheric ducting.

20 Claims, 9 Drawing Sheets

(56) References Cited

U.S. PATENT DOCUMENTS

| | | | |
|---|---|---|---|
| 2015/0381221 A1* | 12/2015 | Cyzs | H04B 1/7097 |
| | | | 375/346 |
| 2020/0336228 A1* | 10/2020 | Ryan | H04J 11/0023 |
| 2020/0344619 A1 | 10/2020 | Gormley et al. | |
| 2020/0359305 A1 | 11/2020 | Chauhan et al. | |
| 2021/0274511 A1 | 9/2021 | Cao et al. | |
| 2021/0385049 A1 | 12/2021 | Zhu et al. | |
| 2023/0080362 A1 | 3/2023 | Channappagoudar et al. | |
| 2023/0087340 A1 | 3/2023 | Li et al. | |

OTHER PUBLICATIONS

"Consideration on RIM framework and mechanisms for improving network robustness", 3GPP TSG RAN WG1 Meeting #94, R1-1808325, Agenda: 7.2.5.1, ZTE, Aug. 20-24, 2018, pp. 1-7.

Indian Application No. 202027009864, "Communication Method and Apparatus", filed on Mar. 7, 2020, pp. 1-46.

Liu et al., "Atmospheric Ducting Effect in Wireless Communications: Challenges and Opportunities", Journal of Communications and Information Networks, vol. 6, No. 2, Jun. 2021, pp. 101-109.

"IEEE 802.11", Wikipedia, Retrieved on May 1, 2025, Webpage available at : https://en.wikipedia.org/wiki/IEEE_802.11.

"IEEE 802.15", Wikipedia, Retrieved on May 1, 2025, Webpage available at : https://en.wikipedia.org/wiki/IEEE_802.15.

Office Action received for corresponding Finnish Patent Application No. 20245559, dated Oct. 3, 2024, 11 pages.

Office Action received for corresponding Finnish Patent Application No. 20245559, dated Mar. 21, 2025, 5 pages.

\* cited by examiner

US 12,463,737 B1

DETERMINING PERFORMANCE IMPACT CAUSED BY TROPOSPHERIC DUCTING

RELATED APPLICATION

This application claims priority to Finnish patent application No. 20245559, filed on May 6, 2024, which is incorporated herein by reference in its entirety.

TECHNICAL FIELD

The following example embodiments relate to wireless communication.

BACKGROUND

When certain atmospheric conditions, such as temperature inversions, cause layers of moist warm air getting trapped between layers of cool dry air, radio frequency waves can "bend" by specific atmospheric refraction and travel along extended paths in the Earth's atmosphere. This effect is called tropospheric ducting.

SUMMARY

The scope of protection sought for various example embodiments is set out by the claims. The example embodiments and features, if any, described in this specification that do not fall under the scope of the claims are to be interpreted as examples useful for understanding various embodiments.

According to a first aspect, there is provided an apparatus comprising: means for collecting training data comprising radio measurement information and one or more performance metrics associated with a plurality of cells; means for determining, based on the radio measurement information comprised in the training data, an operational received interference power value per a cell of the plurality of cells; means for determining, based on additional radio measurement information of the cell, a deviation of the cell from the operational received interference power value; means for determining, based at least on the radio measurement information and the one or more performance metrics of the cell comprised in the training data, a vulnerability threshold above which a performance of the cell is impacted by remote interference caused by tropospheric ducting; means for comparing the deviation of the cell to the vulnerability threshold; and means for determining, based at least on the comparison, whether the performance of the cell is impacted by the remote interference caused by the tropospheric ducting.

According to a second aspect, there is provided the apparatus of the first aspect, further comprising: means for determining, based at least on the comparison, whether to mitigate the remote interference in the cell.

According to a third aspect, there is provided the apparatus of the first or second aspect, further comprising: means for initiating one or more mitigation techniques in the cell for mitigating the remote interference, based at least on determining that the performance of the cell is impacted by the remote interference.

According to a fourth aspect, there is provided the apparatus of the first or second aspect, further comprising: means for refraining from initiating any mitigation techniques in the cell for mitigating the remote interference, based at least on determining that the performance of the cell is not impacted by the remote interference.

According to a fifth aspect, there is provided the apparatus of any of the first to fourth aspects, further comprising: means for evaluating an accuracy of a remote interference detection algorithm of a base station controlling the cell, based on the determination of whether the performance of the cell is impacted by the remote interference.

According to a sixth aspect, there is provided the apparatus of any of the first to fifth aspects, further comprising: means for assigning the cell with a label from a plurality of pre-defined labels based at least on the comparison of the deviation of the cell to the vulnerability threshold, wherein the label indicates a probabilistic confidence of a level of the remote interference.

According to a seventh aspect, there is provided the apparatus of the sixth aspect, further comprising: means for determining, based on the radio measurement information comprised in the training data, an operational received interference power value of one or more neighbor cells of the cell; means for determining, based on additional radio measurement information of the one or more neighbor cells, a deviation of the one or more neighbor cells from the operational received interference power value of the one or more neighbor cells; and means for comparing the deviation of the one or more neighbor cells to the vulnerability threshold, wherein the means for assigning the cell with the label are configured to assign the label based further on the comparison of the deviation of the one or more neighbor cells to the vulnerability threshold.

According to an eighth aspect, there is provided the apparatus of the seventh aspect, further comprising: means for applying an offset to the vulnerability threshold for decreasing the vulnerability threshold for the one or more neighbor cells, wherein the means for comparing the deviation of the one or more neighbor cells to the vulnerability threshold are configured to compare the deviation of the one or more neighbor cells to the vulnerability threshold applied with the offset.

According to a ninth aspect, there is provided the apparatus of the seventh or eighth aspect, further comprising: means for selecting the one or more neighbor cells from the plurality of cells based at least on a maximum distance from the cell, such that a distance between the cell and the one or more neighbor cells is below or equal to the maximum distance.

According to a tenth aspect, there is provided the apparatus of the ninth aspect, wherein the means for selecting the one or more neighbor cells are configured to select the one or more neighbor cells based further on a similarity between an antenna azimuth direction of the cell and an antenna azimuth direction of the one or more neighbor cells.

According to an eleventh aspect, there is provided the apparatus of any of the sixth to tenth aspects, wherein the label indicates that the performance of the cell is not impacted by the remote interference, based on the deviation of the cell not being above the vulnerability threshold.

According to a twelfth aspect, there is provided the apparatus of any of the seventh to tenth aspects, wherein the label indicates that the performance of the cell is likely impacted by the remote interference, based on the deviation of the cell being above the vulnerability threshold, and based on the deviation of the one or more neighbor cells not being above the vulnerability threshold.

According to a thirteenth aspect, there is provided the apparatus of any of the seventh to tenth aspects, wherein the label indicates that the performance of the cell is confirmed to be impacted by the remote interference, based on the deviation of the cell being above the vulnerability threshold, and based on the deviation of the one or more neighbor cells being above the vulnerability threshold.

According to a fourteenth aspect, there is provided the apparatus of any of the first to thirteenth aspects, wherein the radio measurement information comprised in the training data comprises at least a set of received interference power values for each cell of the plurality of cells over a time window, and a set of signal-to-interference-plus-noise ratio levels for each cell of the plurality of cells over the time window, wherein the additional radio measurement information of the cell comprises one or more new received interference power values of the cell that are measured after collecting the training data, wherein the determination of the operational received interference power value of the cell comprises determining a measure of central tendency of the set of received interference power values of the cell comprised in the training data, wherein the determination of the deviation of the cell comprises determining a difference between an average of the one or more new received interference power values of the cell, and the operational received interference power value of the cell, and wherein the determination of the vulnerability threshold is based at least on the set of signal-to-interference-plus-noise ratio levels and the one or more performance metrics of the cell comprised in the training data.

According to a fifteenth aspect, there is provided the apparatus of the fourteenth aspect, wherein the determination of the vulnerability threshold comprises: determining an operational uplink vulnerability level of the cell by determining a measure of central tendency of the set of signal-to-interference-plus-noise ratio levels of the cell comprised in the training data; generating a vulnerability mapping that indicates a relationship between the one or more performance metrics of the cell, the operational uplink vulnerability level of the cell, and the deviation of the cell; and determining the vulnerability threshold based on the vulnerability mapping.

According to a sixteenth aspect, there is provided the apparatus of the fourteenth or fifteenth aspect, wherein the time window comprises at least one week, and wherein a granularity of the set of received interference power values and of the set of signal-to-interference-plus-noise ratio levels is equal to or smaller than one hour.

According to a seventeenth aspect, there is provided the apparatus of any of the first to sixteenth aspects, wherein the one or more performance metrics comprise at least one of: a block error rate, a radio link failure rate, a random-access channel setup success ratio, an uplink data rate, an uplink spectral efficiency, or an uplink modulation coding scheme.

According to an eighteenth aspect, there is provided the apparatus of any of the first to seventeenth aspects, wherein the plurality of cells are configured to apply time-division duplexing.

According to a nineteenth aspect, there is provided a method comprising: collecting training data comprising radio measurement information and one or more performance metrics associated with a plurality of cells; determining, based on the radio measurement information comprised in the training data, an operational received interference power value per a cell of the plurality of cells; determining, based on additional radio measurement information of the cell, a deviation of the cell from the operational received interference power value; determining, based at least on the radio measurement information and the one or more performance metrics of the cell comprised in the training data, a vulnerability threshold above which a performance of the cell is impacted by remote interference caused by tropospheric ducting; comparing the deviation of the cell to the vulnerability threshold; and determining, based at least on the comparison, whether the performance of the cell is impacted by the remote interference caused by the tropospheric ducting.

According to a twentieth aspect, there is provided a computer program comprising instructions which, when executed by an apparatus, cause the apparatus to perform at least the following: collecting training data comprising radio measurement information and one or more performance metrics associated with a plurality of cells; determining, based on the radio measurement information comprised in the training data, an operational received interference power value per a cell of the plurality of cells; determining, based on additional radio measurement information of the cell, a deviation of the cell from the operational received interference power value; determining, based at least on the radio measurement information and the one or more performance metrics of the cell comprised in the training data, a vulnerability threshold above which a performance of the cell is impacted by remote interference caused by tropospheric ducting; comparing the deviation of the cell to the vulnerability threshold; and determining, based at least on the comparison, whether the performance of the cell is impacted by the remote interference caused by the tropospheric ducting.

According to a twenty-first aspect, there is provided a non-transitory computer readable medium comprising program instructions which, when executed by an apparatus, cause the apparatus to perform at least the following: collecting training data comprising radio measurement information and one or more performance metrics associated with a plurality of cells; determining, based on the radio measurement information comprised in the training data, an operational received interference power value per a cell of the plurality of cells; determining, based on additional radio measurement information of the cell, a deviation of the cell from the operational received interference power value; determining, based at least on the radio measurement information and the one or more performance metrics of the cell comprised in the training data, a vulnerability threshold above which a performance of the cell is impacted by remote interference caused by tropospheric ducting; comparing the deviation of the cell to the vulnerability threshold; and determining, based at least on the comparison, whether the performance of the cell is impacted by the remote interference caused by the tropospheric ducting.

According to a twenty-second aspect, there is provided a computer readable medium comprising program instructions which, when executed by an apparatus, cause the apparatus to perform at least the following: collecting training data comprising radio measurement information and one or more performance metrics associated with a plurality of cells; determining, based on the radio measurement information comprised in the training data, an operational received interference power value per a cell of the plurality of cells; determining, based on additional radio measurement information of the cell, a deviation of the cell from the operational received interference power value; determining, based at least on the radio measurement information and the one or more performance metrics of the cell comprised in the training data, a vulnerability threshold above which a performance of the cell is impacted by remote interference caused by tropospheric ducting; comparing the deviation of the cell to the vulnerability threshold; and determining, based at least on the comparison, whether the performance of the cell is impacted by the remote interference caused by the tropospheric ducting.

According to a twenty-third aspect, there is provided an apparatus comprising at least one processor, and at least one memory storing instructions that, when executed by the at least one processor, cause the apparatus at least to: collect training data comprising radio measurement information and one or more performance metrics associated with a plurality of cells; determine, based on the radio measurement information comprised in the training data, an operational received interference power value per a cell of the plurality of cells; determine, based on additional radio measurement information of the cell, a deviation of the cell from the operational received interference power value; determine, based at least on the radio measurement information and the one or more performance metrics of the cell comprised in the training data, a vulnerability threshold above which a performance of the cell is impacted by remote interference caused by tropospheric ducting; compare the deviation of the cell to the vulnerability threshold; and determine, based at least on the comparison, whether the performance of the cell is impacted by the remote interference caused by the tropospheric ducting.

BRIEF DESCRIPTION OF THE DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments within the scope of the claims. Furthermore, the words "comprising" and "including" should be understood as not limiting the described embodiments to consist of only those features that have been mentioned, and such embodiments may also contain features that have not been specifically mentioned. Reference numbers, in the description and/or in the claims, serve to illustrate the embodiments with reference to the drawings, without limiting the embodiments to these examples only.

Some example embodiments described herein may be implemented in a wireless communication network comprising a radio access network based on one or more of the following radio access technologies (RATs): global system for mobile communications (GSM) or any other second generation (2G) radio access technology, universal mobile telecommunication system (UMTS, 3G) based on basic wideband-code division multiple access (W-CDMA), high-speed packet access (HSPA), long term evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the evolved universal terrestrial radio access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

Figure 1:
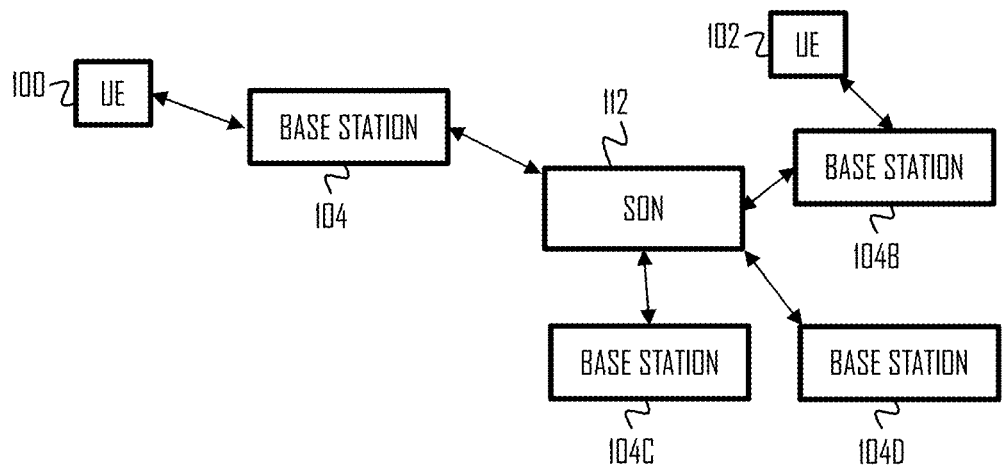
FIG. 1 illustrates an example of a wireless communication network.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the example embodiments described herein to other wireless communication networks provided with necessary properties.

The example wireless communication network shown in FIG. 1 includes a radio access network (RAN).

FIG. 1 shows user equipment (UE) 100, 102 configured to be in a wireless connection on one or more communication channels in a radio cell with a base station 104, 104B of a radio access network.

A base station 104 may comprise a computing device configured to control the radio resources of the base station 104 and to be in a wireless connection with one or more UEs 100, 102. The base station 104 may also be referred to as a base transceiver station (BTS), an access node, an access point, a cell site, a network node, a radio access network node, or a RAN node.

The base station 104 may be, for example, an evolved NodeB (abbreviated as eNB or eNodeB), or a next generation evolved NodeB (abbreviated as ng-eNB), or a next generation NodeB (abbreviated as gNB or gNodeB), providing the radio cell. The base station 104 may include or be coupled to transceivers. From the transceivers of the base station 104, a connection may be provided to an antenna unit that establishes a bi-directional radio link to one or more UEs 100, 102. The antenna unit may comprise an antenna or antenna element, or a plurality of antennas or antenna elements.

The wireless connection (e.g., radio link) from a UE 100, 102 to the base station 104 may be called uplink (UL) or reverse link, and the wireless connection (e.g., radio link)

from the base station 104 to the UE 100, 102 may be called downlink (DL) or forward link. A UE 100 may also communicate directly with another UE 102, and vice versa, via a wireless connection generally referred to as a sidelink (SL). It should be appreciated that the base station 104 or its functionalities may be implemented by using any node, host, server, access point or other entity suitable for providing such functionalities.

The radio access network may comprise more than one base station, in which case the base stations 104, 104B, 104C, 104D may also be configured to communicate with one another over wired or wireless links. These links between base stations may be used for sending and receiving control plane signaling and also for routing data from one base station to another base station.

The base stations 104, 104B, 104C, 104D may be connected to a self-organizing network (SON 112). The SON 112 is an automation technology designed to make the planning, configuration, management, optimization and healing of radio access networks simpler and faster. With the SON 112, operational base stations may regularly self-optimize parameters and algorithmic behavior in response to observed network performance and radio conditions. Furthermore, self-healing mechanisms can be triggered to temporarily compensate for a detected equipment outage, while awaiting a more permanent solution. For example, the SON 112 may comprise a centralized SON. In some instances, the SON solution can be distributed, this is the case when algorithms operate within the base station.

The base stations 104, 104B, 104C, 104D are connected to a core network (CN). The core network may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and/or a mobility management entity (MME). The 5GC may comprise one or more network functions, such as at least one of: a user plane function (UPF), an access and mobility management function (AMF), a location management function (LMF), and/or a session management function (SMF).

The core network may also be able to communicate with one or more external networks, such as a public switched telephone network or the Internet, or utilize services provided by them. For example, in 5G wireless communication networks, the UPF of the core network may be configured to communicate with an external data network via an N6 interface. In LTE wireless communication networks, the P-GW of the core network may be configured to communicate with an external data network.

It should also be understood that the distribution of functions between core network operations and base station operations may differ in future wireless communication networks compared to that of the LTE or 5G, or even be non-existent.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device, just to mention but a few names. The UE 100, 102 may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or a computing device comprising a wireless modem integrated in a vehicle.

It should be appreciated that the UE 100, 102 may also be a nearly exclusive uplink-only device, of which an example may be a camera or video camera loading images or video clips to a network. The UE 100, 102 may also be a device having capability to operate in an Internet of Things (IoT) network, which is a scenario in which objects may be provided with the ability to transfer data over a network without requiring human-to-human or human-to-computer interaction.

The wireless communication network may also be able to support the usage of cloud services. For example, at least part of core network operations may be carried out as a cloud service. The UE 100, 102 may also utilize the cloud. In some applications, the computation for a given UE may be carried out in the cloud or in another UE.

The wireless communication network may also comprise a central control entity, such as a network management system (NMS), or the like. The NMS is a centralized suite of software and hardware used to monitor, control, and administer the network infrastructure. The NMS is responsible for a wide range of tasks such as fault management, configuration management, security management, performance management, and accounting management. The NMS enables network operators to efficiently manage and optimize network resources, ensuring that the network delivers high performance, reliability, and security.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple-input and multiple-output (MIMO) antennas in the base station 104 and/or the UE 100, 102, many more base stations than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine-type applications, such as (massive) machine-type communications (mMTC), including vehicular safety, different sensors and real-time control.

In 5G wireless communication networks, base stations and/or UEs may have multiple radio interfaces, such as below 6 gigahertz (GHz), centimeter wave (cmWave) and millimeter wave (mmWave), and also being integrable with legacy radio access technologies, such as LTE. Integration with LTE may be implemented, for example, as a system, where macro coverage may be provided by LTE, and 5G radio interface access may come from small cells by aggregation to LTE. In other words, a 5G wireless communication network may support both inter-RAT operability (such as interoperability between LTE and 5G) and inter-RI operability (inter-radio interface operability, such as between below 6 GHz, cmWave, and mmWave).

5G wireless communication networks may also apply network slicing, in which multiple independent and dedicated virtual sub-networks (network instances) may be created within the same physical infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In one embodiment, a base station 104, 104B, 104C, 104D may comprise: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example via an F1 interface. Such an embodiment of the base station may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be a logical node hosting radio resource control (RRC), service data adaptation protocol (SDAP) and/or packet data convergence protocol (PDCP), of the NR protocol stack for a base station. The CU may comprise a control plane (CU-CP), which may be a logical node hosting the RRC and the control plane part of the PDCP protocol of the NR protocol stack for the base station. The CU may further comprise a user plane (CU-UP), which may be a logical node hosting the user plane part of the PDCP protocol and the SDAP protocol of the CU for the base station.

The DU may be a logical node hosting radio link control (RLC), medium access control (MAC) and/or physical (PHY) layers of the NR protocol stack for the base station. The operations of the DU may be at least partly controlled by the CU. It should also be understood that the distribution of functions between the DU and the CU may vary depending on the implementation.

Cloud computing systems may also be used to provide the CU and/or DU. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

It is obvious for a person skilled in the art that the base stations 104, 104B, 104C, 104D depicted in FIG. 1 are just an example of a part of a radio access network, and in practice the radio access network may comprise a different number of base stations than shown in FIG. 1, the UEs 100, 102 may have access to a plurality of radio cells, and the radio access network may also comprise other apparatuses, such as physical layer relay access nodes or other entities. At least one of the base stations may be a Home eNodeB or a Home gNodeB. A Home gNodeB or a Home eNodeB is a type of access node that may be used to provide indoor coverage inside a home, office, or other indoor environment.

Additionally, in a geographical area of a radio access network, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The base station(s) 104, 104B, 104C, 104D of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of radio access networks, the concept of "plug-and-play" access nodes may be introduced. A radio access network, which may be able to use "plug-and-play" access nodes, may include, in addition to Home eNodeBs or Home gNodeBs, a Home Node B gateway (HNB-GW) (not shown in FIG. 1). An HNB-GW, which may be installed within an operator's radio access network, may aggregate traffic from a large number of Home eNodeBs or Home gNodeBs back to a core network of the operator.

6G wireless communication networks are expected to adopt flexible decentralized and/or distributed computing systems and architecture and ubiquitous computing, with local spectrum licensing, spectrum sharing infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Figure 2:
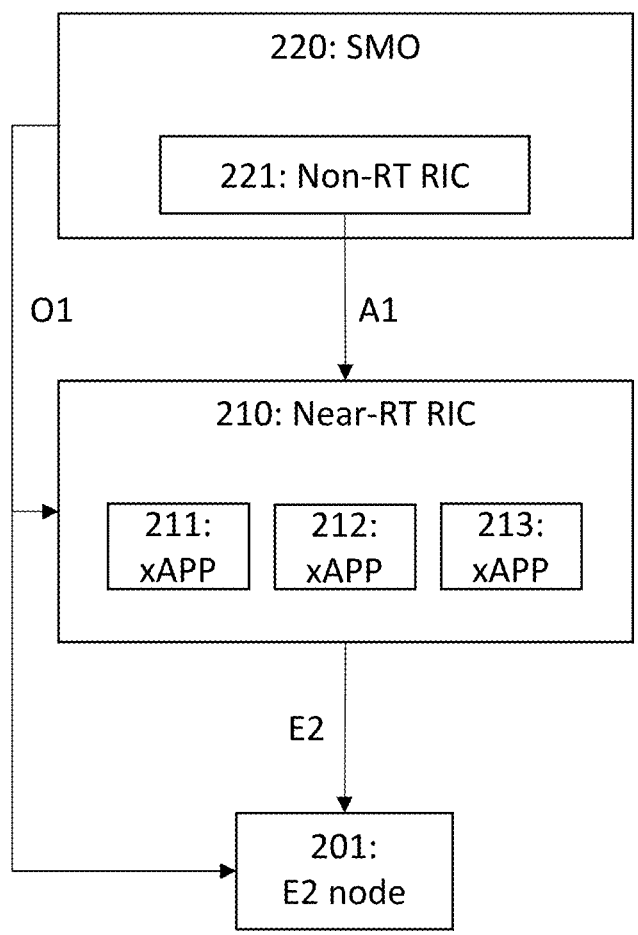
FIG. 2 illustrates an example of a system.

FIG. 2 illustrates an example of a system based on open radio access network (O-RAN) architecture.

The O-RAN architecture comprises two parts: 1) a split architecture part with 5G standalone architecture, each of which is called an E2 node 201, and 2) an automation part that comprises a near-real-time (near-RT) radio access network intelligent controller (RIC) 210 located within the radio access network, and a non-real-time (non-RT) RIC 221 located within a network management entity called service management and orchestration (SMO) 220.

The SMO 220 may be connected to the RAN network functions, including the near-RT RIC 210, via an O1 interface.

The non-RT RIC 221 (which resides in the SMO 220) performs non-real-time operations. The non-RT RIC 221 may communicate with the near-RT RIC 210 through the O1 and/or A1 interface. The non-RT RIC 221 may be used to control the near-RT RIC 210. For example, the non-RT RIC 221 may modify the near-RT RIC platform 210 and/or the internal applications 211, 212, 213 (xApps) of the near-RT RIC 210. Furthermore, the non-RT RIC 221 may monitor, analyze and provide feedback on the state of the near-RT RIC 210, provide enrichment information, and/or facilitate, train and distribute machine learning models for the previously mentioned tasks.

The near-RT RIC 210 may communicate with one or more E2 nodes 201 through the E2 interface for time-sensitive near-real-time management and control of radio resources, such as interference management, handover management, Quality of Service (QOS) management, and radio connection management.

An E2 node 201 may be defined as a logical node terminating the E2 interface interfacing with the near-RT RIC 210. An E2 node may comprise or execute one or more RAN functions. For example, an E2 node 201 may comprise at least one of: an O-RAN central unit control plane (O-CU-CP), an O-RAN central unit user plane (O-CU-UP), an O-RAN distributed unit (O-DU), and/or a base station 104, 104B, 104C, 104D such as an O-RAN eNB (O-eNB). Although only one E2 node 201 is shown in FIG. 2, it should be noted there may also be more than one E2 node connected to the near-RT RIC 210.

The near-RT RIC 210 may host one or more xApps 211, 212, 213 and common framework platform functions 214 to support and be used by the xApps 211, 212, 213. Although three xApps 211, 212, 213 are shown in FIG. 2, it should be noted that the number of xApps 211, 212, 213 may also be different than three (i.e., there may be one or more xApps).

A given xAPP 211, 212, 213 may control some RAN function(s) or a part of it. The xApps 211, 212, 213 can also exchange information between them, enabling to build sophisticated use cases leveraging the capabilities of the multiple xApps 211, 212, 213. An xApp 211, 212, 213 may comprise a descriptor and a software package. The descriptor provides metadata on the xApp related to its version, provider, software package location, management information regarding fault, configuration, accounting, performance and security (FCAPS), and the data types that it takes as input as well as the data types that it produces as output. The software package implements the logic that collects RAN-related information coming from the E2 node(s) 201 and provides optimized and intelligent RAN control decisions.

Figure 3:
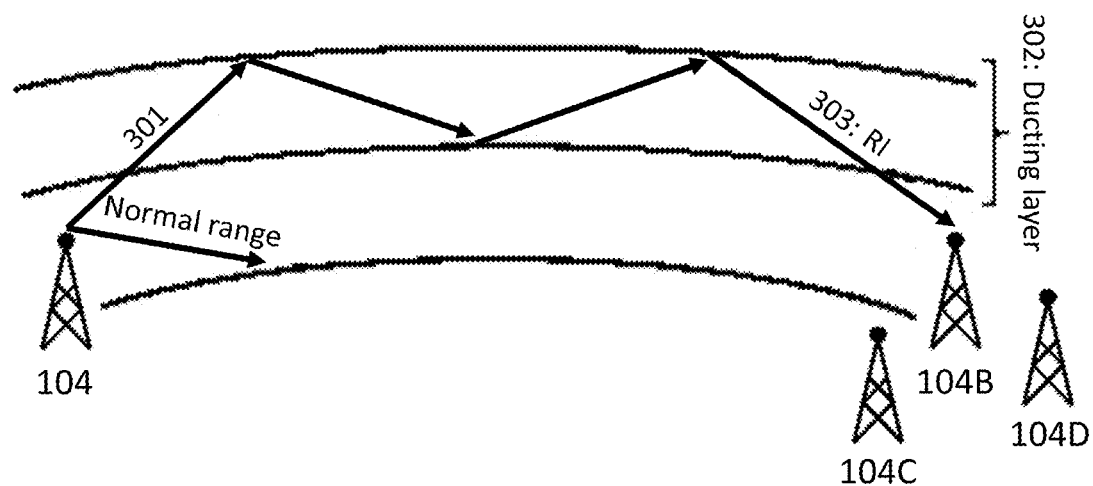
FIG. 3 illustrates tropospheric ducting.

FIG. 3 illustrates tropospheric ducting. As the deployment of time-division duplexing (TDD) spectrum for 5G services expands, tropospheric conditions have become a relevant topic among network operators due to its impact on network performance. When certain atmospheric conditions, such as temperature inversions, cause layers of moist warm air getting trapped between layers of cool dry air, radio frequency waves can "bend" by specific atmospheric refraction and travel along extended paths in the Earth's atmosphere. In other words, in certain atmospheric conditions, radio waves may be trapped in the lower layers of the Earth's atmosphere in a so-called ducting layer 302. This effect is called tropospheric ducting. This bending allows radio signals 301 to experience less attenuation and, as a result, propagate over much longer distances than they normally would. These long-traveling signals 301 may be harmful especially to TDD systems.

Figure 4:
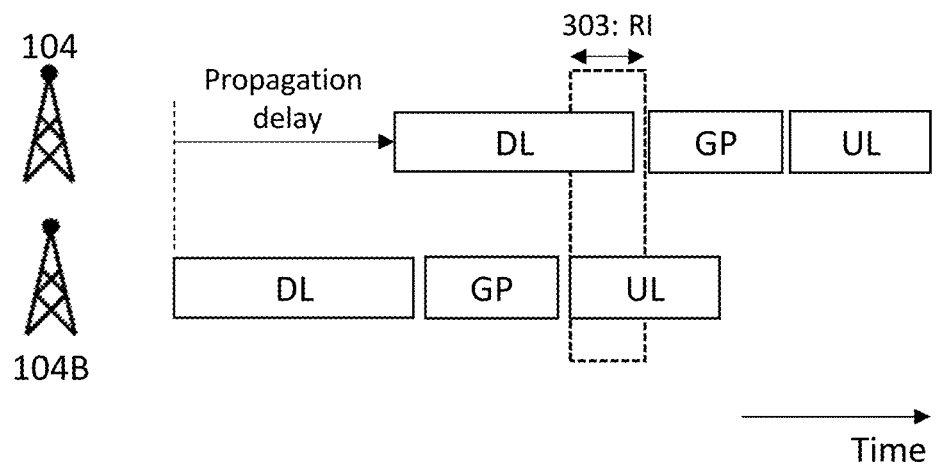
FIG. 4 illustrates time-division duplexing.

FIG. 4 illustrates time-division duplexing. TDD uses a transmission structure, where downlink and uplink transmissions occur over the same frequency band. Communication happens via a defined frame structure, where some slots are used for downlink (DL) transmissions, while other slots are used for uplink (UL) transmissions, along with slots containing both DL and UL with a guard period (GP) in between. The guard period between DL and UL slots ensures that, under normal (non-ducting) propagation conditions, the DL transmissions from one base station 104B do not cause interference into the UL slots of another nearby base station 104C, 104D.

In the presence of favorable tropospheric ducting (tropo-ducting) conditions, "bent" radio signals 301 experience less attenuation, and when traveling long distances, may cause remote interference (RI) 303. Remote interference is a specific type of interference among distant TDD base stations 104, 104B, 104C, 104D (e.g., gNBs), operating under the same (or overlapping) frequency channels, due to the result of the propagation delay of the long-distance radio signal 301 exceeding the provisioned guard period of the TDD system. When tropospheric ducting occurs, downlink signals 301 of the so-called aggressor base station 104 may be captured by uplink receivers of the so-called victim base station(s) 104B, 104C, 104D. The spectrum in which this effect occurs may be approximately from 0.3 to 30 gigahertz (GHz), thus covering the most widely used frequency bands in 5G networks.

Propagation conditions in tropospheric ducting depend mainly on humidity, air temperature and pressure of the troposphere. Since humidity plays a major role, remote interference is more probable in regions with high evaporation rates (e.g., tropical regions, coastal environments). In inland areas, remote interference may be present more strongly during the transition between seasons (e.g., spring to summer and summer to autumn), and for coastal areas during winter, though it has been observed throughout the year in certain areas.

The intensity of tropospheric ducting varies based on many factors. However, it should be noted that uplink paths suffer tremendously in intense ducting situations. The impact of remote interference to mobile networks may be seen as a detriment of the UE's ability to gain access and retain reliable service. During tropospheric ducting conditions, performance may be significantly degraded compared to non-ducting periods, for example in terms of block error rate (BLER), random-access channel (RACH) success rates, success rates of accessing the network, radio failure rates, cell throughput, and user throughput. Therefore, the impact of remote interference caused by tropospheric ducting can be severe, possibly affecting the ability to access the network and to make voice and data calls.

The 3rd generation partnership project (3GPP) has defined four different frameworks to manage remote interference. A common aspect across all these frameworks is the assumption that the atmospheric ducting phenomenon happens, and the remote interference appears. This statement indicates that detection of the appearance of remote interference is a RAN vendor-specific development. With this mechanism outsourced, one possible detection implementation uses received signal strength measurements, or signal-to-interference-plus-noise ratio (SINR) measurements, on a per-symbol basis. Time-domain measurements may be compared to a pre-defined cell-level threshold, and a flag may be raised so that further interference mitigation mechanisms can act.

Mitigation of tropospheric ducting may lead to the application of cell-level limitations to protect the victim cell from the remote interference. Therefore, the algorithm used to detect the presence of such interference needs a high degree of accuracy to avoid unnecessary limitations to the capabilities of the base station, such as muting (not transmitting) on certain symbols or slots, reducing transmit power, increasing downtilt, or other techniques to try to reduce the amount of interference resulting from tropospheric ducting.

Any mitigation technique applied to cancel the remote interference can only be as good as the detection algorithm used to detect it. Given the nature of the remote interference caused by tropospheric ducting, currently there seems to be no mechanism available for verifying whether the detection algorithm is accurate. Inaccurate detection of interference may lead to decreased network performance, such as loss of transmit opportunities or reduced coverage. If remote interference is falsely detected and unnecessary remote interference management actions are taken (e.g., increasing the effective guard period on the remote cells generating the DL-to-UL interference), then there will be an unnecessary loss of DL system capacity. On the other hand, if the remote interference fails to be detected, when it is actually present, then UL performance on the victim cells (which are affected by the remote interference) may be significantly impaired.

Therefore, there is a need for a mechanism to accurately detect tropospheric ducting events that impact mobile networks and allow self-optimizing platforms (e.g., the SON 112 or near-RT RIC 210) to apply mitigation and/or to serve as a baseline for a proper measurement of how well the base station's detection algorithm is performing.

Some example embodiments provide a method for detecting remote interference that combines interference levels, an evaluation of the system vulnerability, and optionally spatial contextualization to determine that the interference is caused by tropospheric ducting and needs mitigation. This method may utilize radio measurement information, such as network performance indicators. The method can detect instances of remote interference, avoiding potential mitigations when the remote interference is not degrading the performance of the cell.

For example, the method may be beneficial for RI detection for interference mitigation on higher-level orchestrating systems, such as SON 112 or O-RAN near-RT RIC 210, as well as for verification of RI detection algorithms implemented in RAN base stations 104, 104B, 104C, 104D.

Figure 5:
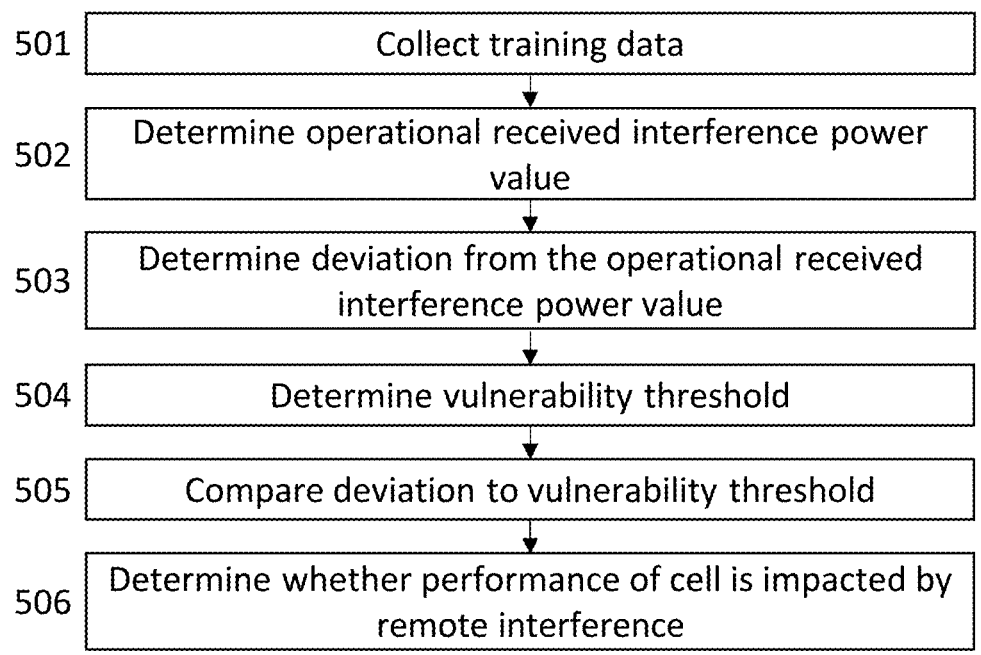
FIG. 5 illustrates a flow chart.

FIG. 5 illustrates a flow chart according to an example embodiment of a method for determining whether the performance of a cell is impacted by remote interference caused by tropospheric ducting. The method of FIG. 5 may be performed by an apparatus 1400 depicted in FIG. 14.

Referring to FIG. 5, in block 501, training data is collected, wherein the training data comprises radio measurement information and one or more performance metrics associated with a plurality of cells 104B, 104C, 104D.

The training data may be collected or received from a plurality of base stations controlling the plurality of cells 104B, 104C, 104D, or from a network management system (NMS) or SMO 220. The plurality of cells (or the plurality of base stations) 104B, 104C, 104D may be configured to apply time-division duplexing.

For example, the radio measurement information may comprise at least a set of received interference power (RIP) values for each cell of the plurality of cells over a time window, and a set of signal-to-interference-plus-noise ratio levels for each cell of the plurality of cells over the time window. The time window may also be referred to as a training period herein.

For example, the time window may comprise at least one week, and a granularity of the set of received interference power values and of the set of signal-to-interference-plus-noise ratio levels may be equal to or smaller than one hour. The granularity may also be referred to as a measurement period (i.e., the period of a single sample). For example, the training data may be collected on an hourly basis (or even every 15 minutes) over at least one or two weeks in order to collect a sufficient amount of data to determine the normal interference operation of the cell. However, it may also be possible to use a time window of less than one week and/or a granularity of over one hour.

In block 502, based on the radio measurement information comprised in the training data, an operational received interference power value per a cell 104B of the plurality of cells 104B, 104C, 104D is determined. The operational received interference power value indicates the normal interference operation of the cell.

For example, the determination of the operational received interference power value of the cell (104B) may comprise determining a measure of central tendency of the set of received interference power values of the cell 104B comprised in the training data. The measure of central tendency is a statistical measure that identifies a single value as representative of an entire distribution. For example, the measure of central tendency may refer to the median, or the mean, or the mode of the set of received interference power values. As another example, the measure of central tendency may refer to a percentile distribution other than the median (e.g., the $30^{th}$ percentile or the $75^{th}$ percentile).

In block 503, based on additional radio measurement information of the cell 104B, a deviation of the cell 104B from the operational received interference power value of the cell 104B is determined. The deviation may be denoted as DQ50 herein.

For example, the determination of the deviation of the cell 104B may comprise determining a difference between an average of one or more new received interference power values of the cell 104B, and the operational received interference power value of the cell 104B.

In block 504, a vulnerability threshold of the cell 104B is determined based at least on the radio measurement information and the one or more performance metrics of the cell (104B) comprised in the training data. The vulnerability threshold is a threshold above which a performance of the cell 104B is impacted by remote interference caused by tropospheric ducting.

For example, the determination of the vulnerability threshold may be based at least on the set of signal-to-interference-plus-noise ratio levels and the one or more performance metrics of the cell 104B comprised in the training data.

In block 505, the deviation of the cell 104B is compared to the vulnerability threshold.

In block 506, based at least on the comparison, it is determined whether the performance of the cell 104B is impacted by the remote interference caused by the tropospheric ducting. If the deviation is above the threshold, then the performance of the cell may be determined to be impacted by the remote interference. If the deviation is not above the threshold, then the performance of the cell may be determined to not be impacted by the remote interference.

Figure 6:
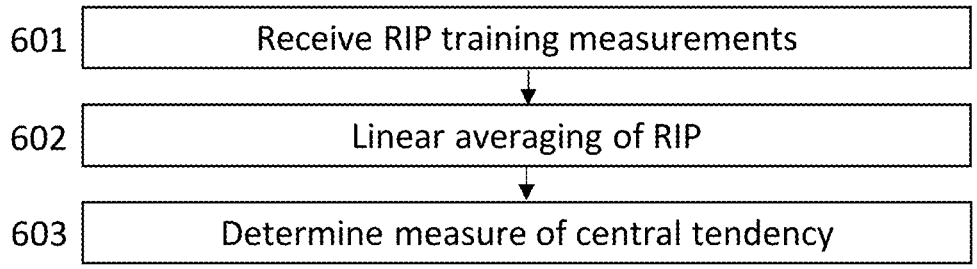
FIG. 6 illustrates a flow chart.

FIG. 6 illustrates a flow chart according to an example embodiment of a method for determining the operational received interference power value of a cell. The method of FIG. 6 may be comprised in block 502 of FIG. 5. The method of FIG. 6 may be performed by an apparatus 1400 depicted in FIG. 14.

Referring to FIG. 6, in block 601, a set of received interference power values for each cell of the plurality of cells is collected or received over the time window (training period). The set of received interference power values may be part of the training data collected in block 501 of FIG. 5.

In block 602, for every measurement period (e.g., 1 hour), an average received interference power value of a given cell is determined based on the set of received interference power values collected for that cell.

If received interference power values are available per resource blocks or subbands, such average may be obtained using the linear/milliwatt-to-mean-to-log/decibel (dBm) conversion. In other words, for each measurement period, the received interference power values from sub-parts of the transmitted base station's spectrum bandwidth may be initially measured in dBm, then converted to linear units, then averaged in the linear form, and the average value is then finally converted from linear form back to dBm (i.e., logarithmic scale).

In block 603, the operational received interference power value per a cell of the plurality of cells is determined, for example, by determining a measure of central tendency of the average received interference power values collected over the time window (i.e., the training period needed to extract the "normal" interference operation) for that respective cell. For example, the time window (training period) may comprise one to two weeks' worth of data.

In other words, the normal cell operation may be determined by extracting, for example, the median or mean of the cell's received interference power data. The operational received interference power value may be calculated separately for each cell of the plurality of cells from the measured received interference power values of that specific cell (i.e., the median or mean may be calculated based on the data of a single cell).

Figure 7:
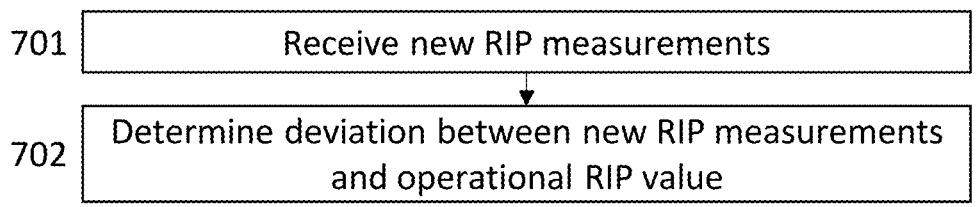
FIG. 7 illustrates a flow chart.

FIG. 7 illustrates a flow chart according to an example embodiment of a method for determining the deviation from the operational received interference power value. The method of FIG. 7 may be comprised in block 503 of FIG. 5. The method of FIG. 7 may be performed by an apparatus 1400 depicted in FIG. 14.

Referring to FIG. 7, in block 701, additional radio measurement information is received. The additional radio measurement information may comprise one or more new received interference power values measured for the cell after the time window or training period (i.e., the new RIP measurements may be received after collecting the training data used for determining the operational received interference power value of the cell).

In block 702, a deviation (DQ50) of the cell from the operational received interference power value is determined by comparing the one or more new received interference power values of the cell (in dBm) to the cell's operational received interference power value. In other words, the deviation indicates the difference between the average of the one or more new received interference power values of the cell, and the operational received interference power value of the same cell. This deviation identifies abnormalities from the normal interference level of the cell (i.e., from the operational received interference power value). The deviation may be determined separately for each cell of the plurality of cells based on the RIP measurements of the respective cell.

Figure 8:
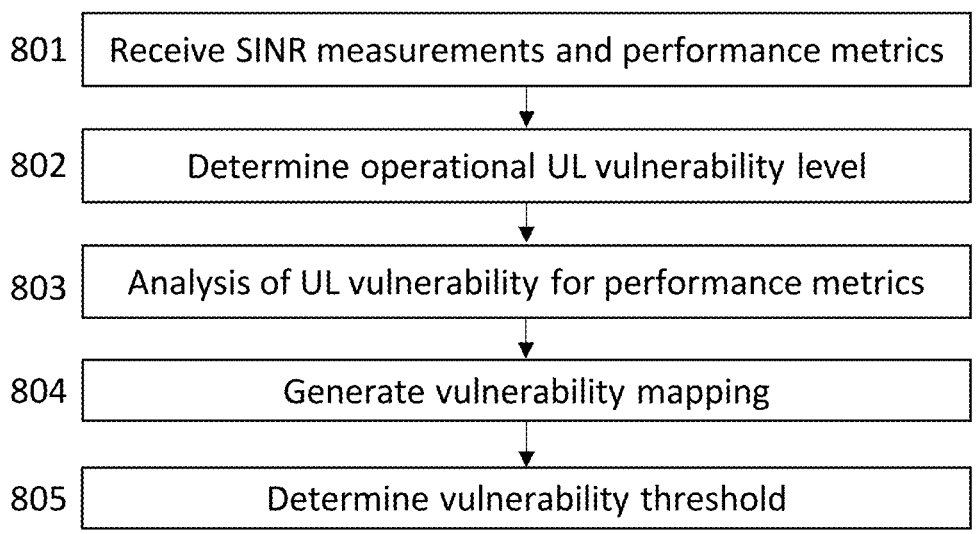
FIG. 8 illustrates a flow chart.

FIG. 8 illustrates a flow chart according to an example embodiment of a method for determining the vulnerability threshold. The method of FIG. 8 may be comprised in block 504 of FIG. 5. The method of FIG. 8 may be performed by an apparatus 1400 depicted in FIG. 14.

Referring to FIG. 8, in block 801, a set of signal-to-interference-plus-noise ratio levels and one or more performance metrics are collected or received for each cell of the plurality of cells over the time window (training period). The set of signal-to-interference-plus-noise ratio levels and the one or more performance metrics may be part of the training data collected in block 501 of FIG. 5.

The one or more performance metrics may comprise, for example, at least one of: a block error rate, a radio link failure rate, a random-access channel setup success ratio, an uplink data rate, an uplink spectral efficiency, or an uplink modulation coding scheme. The one or more performance metrics may also be referred to as one or more key performance indicators (KPIs) or performance information of the cell. The one or more performance metrics may be measured separately for each cell of the plurality of cells.

In block 802, an operational uplink vulnerability level of the cell is determined based on the set of signal-to-interference-plus-noise ratio levels comprised in the training data. For example, the operational uplink radio frequency vulnerability level of the cell may be determined by determining a measure of central tendency of the set of signal-to-interference-plus-noise ratio levels of the cell. The measure of central tendency is a statistical measure that identifies a single value as representative of an entire distribution. For example, the measure of central tendency may refer to the median, or the mean, or the mode of the set of signal-to-interference-plus-noise ratio levels. As another example, the measure of central tendency may refer to a percentile distribution other than the median (e.g., the $30^{th}$ percentile or the $75^{th}$ percentile).

UL vulnerability is a measure of the percentage of traffic in the cell that will be impacted substantially by UL interference, preventing the UL from being reliable unless the interference is mitigated. One approach for quantifying the vulnerability is to look at the percentage of UL decodes that fall in a "marginal" UL SINR range—i.e., those that would fail to be reliable if UL interference caused significant further SINR reduction. This can be done, for example, as follows:

numerator_cols=[UE_SINR_PUSCH_R1_LEVEL_i for i in range (2, 9)]
denominator_cols=[UE_SINR_PUSCH_R1_LEVEL_j for j in range (2, 26)]

In the above example, the numerator is the sum total of UL SINR decodes that fall in the −10 to 0 dB range (note here that the lowest SINR bin is excluded as these are often cases where an UL grant was sent to the UE but the UE did not receive it and/or did not transmit on the UL, and therefore the measured SINR is very low due to absence of an actual signal—these are thus not cases that are UL interference driven, and should thus be excluded from the vulnerability metric).

The denominator is the sum total of all UL decodes, except for those in lowest SINR bin—for the same reason as the above—i.e., the UE did not transmit at all in these cases (bin1).

The above represents an illustrative example of the vulnerability calculation. The exact thresholds used for UL SINR may vary according to implementation, and other metrics than UL SINR (such as UL BLER, UL throughput, UL modulation-and-coding scheme) may be used instead of, or in addition to, UL SINR to establish the percentage of traffic that may suffer from an unreliable uplink if the UL interference from tropospheric ducting is unmitigated, and the degree of reliability impact for the same.

In block 803, the operational vulnerability level of the cell is analyzed for the one or more performance metrics of the cell.

Figure 9:
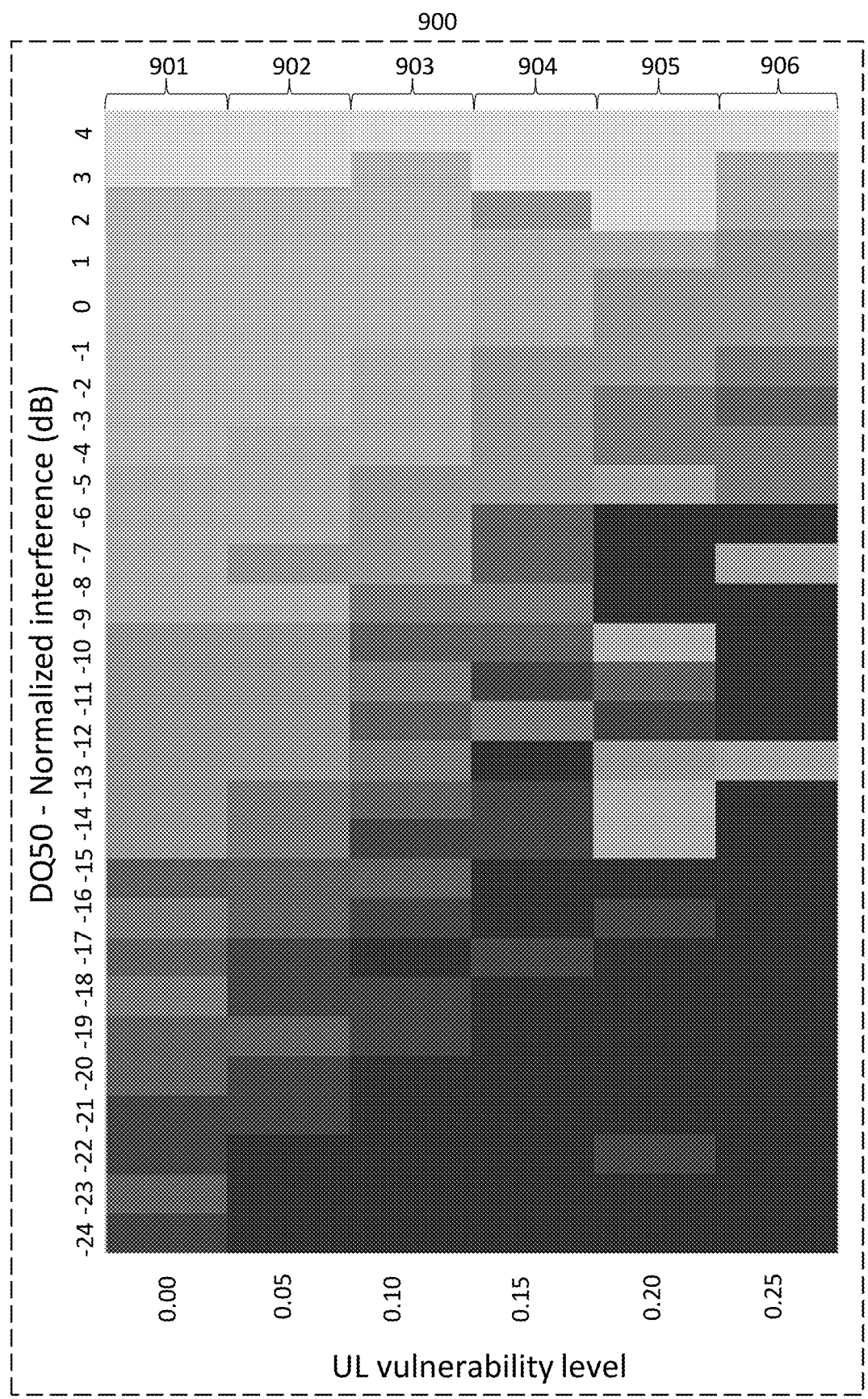
FIG. 9 illustrates an example of a vulnerability mapping.

In block 804, a vulnerability mapping is generated based on the analysis. The vulnerability mapping indicates a relationship between the one or more performance metrics of the cell, the operational uplink vulnerability level of the cell, and the deviation (DQ50) of the cell. For example, the vulnerability mapping may comprise a heatmap of the one or more performance metrics, as shown in FIG. 9. FIG. 9 illustrates an example of the vulnerability mapping 900, wherein the vulnerability mapping comprises a heatmap of initial uplink BLER (as an example of a performance metric), such that darker areas of FIG. 9 indicate higher BLER, and lighter areas of FIG. 9 indicate lower BLER. The measured BLER of a cell may be presented in one row 901, 902, 903, 904, 905, 906 of the heatmap 900. FIG. 9 shows that less vulnerable cells (e.g., in the rows 901, 902) are more resilient and can tolerate higher interference before performance degradation is observed (e.g., in terms of BLER). Additionally, the more vulnerable cells (e.g., in the rows 905, 906) indicate cells that are less resilient and will experience performance degradation (e.g., in terms of BLER) at lower interference levels compared to the less vulnerable cells.

For generating the vulnerability mapping 900, the deviation (DQ50) samples of a given cell may be determined based on the new received interference power values of the cell received in block 701 (e.g., a given deviation DQ50 sample may be calculated as a difference between a given new received interference power value and the operational received interference power value), or based on the set of received interference power values in the training data of the cell received in block 501 or 601 (e.g., a given deviation DQ50 sample may be calculated as a difference between a given RIP training measurement and the operational received interference power value). Multiple deviation values may be determined for a given cell to generate the vulnerability mapping 900 that shows the relationship between the one or more performance metrics and each deviation value.

In block 805, the vulnerability threshold of the cell is determined based on the vulnerability mapping. The vulnerability threshold is a cell-specific threshold above which the performance of the cell is deemed impacted (i.e., degraded) by remote interference. In other words, the vulnerability threshold indicates at what interference conditions the cell's performance is impacted or degraded. Less vulnerable cells are more resilient and can withstand higher interference before performance degradation is observed. The vulnerability threshold may be determined separately for each cell of the plurality of cells. The expected vulnerability operating level may be used to determine the vulnerability threshold above which the cell is classified as "under degrading interference". The vulnerability threshold may be a-priori determined via analytical analysis.

The determination of the vulnerability threshold may comprise determining the interference level at which the performance of a given cell is impacted or degraded, based on the vulnerability mapping (heatmap) 900 of the operational uplink vulnerability levels, the one or more performance metrics and the normalized interference "DQ50" (e.g., as shown in FIG. 9). The objective is to obtain, for various ranges of vulnerability levels, the deviation "DQ50", in which the one or more performance metrics of the cell are visibly degrading, and this deviation DQ50 may then be set as the vulnerability threshold for that cell. In other words, the aim is to identify the point where UL reliability and performance will significantly suffer in the presence of additional (above normal) UL interference. These samples may be compared to all DQ50 samples obtained in such a cell.

In one embodiment, a three-dimensional correlation heatmap may be created to determine the interference level for each category of vulnerability that leads to performance degradation. Network data may vary, but some non-limiting examples of the vulnerability threshold are described in the following.

As an example, referring to FIG. 9, if the operational vulnerability level of the cell is lower than 0.05 (5%), then the vulnerability threshold may be set to −6 dB. As another example, if the operational vulnerability level of the cell is lower than 0.10 (10%) but higher than or equal to 0.05 (5%), then the vulnerability threshold may be set to −4 dB. As another example, if the operational vulnerability level of the cell is lower than 0.15 (lower than 15%) but higher than or equal to 0.10 (10%), then the vulnerability threshold may be set to −2 dB. As another example, if the operational vulnerability level of the cell is equal to or above 0.15 (15%), then the vulnerability threshold may be set to 0 dB.

A given cell may be determined as under remote interference if its measured remote interference reaches levels above the vulnerability threshold obtained for the cell's operating uplink vulnerability level. Such cells may be marked as likely victims impacted by tropospheric ducting.

Figure 10:
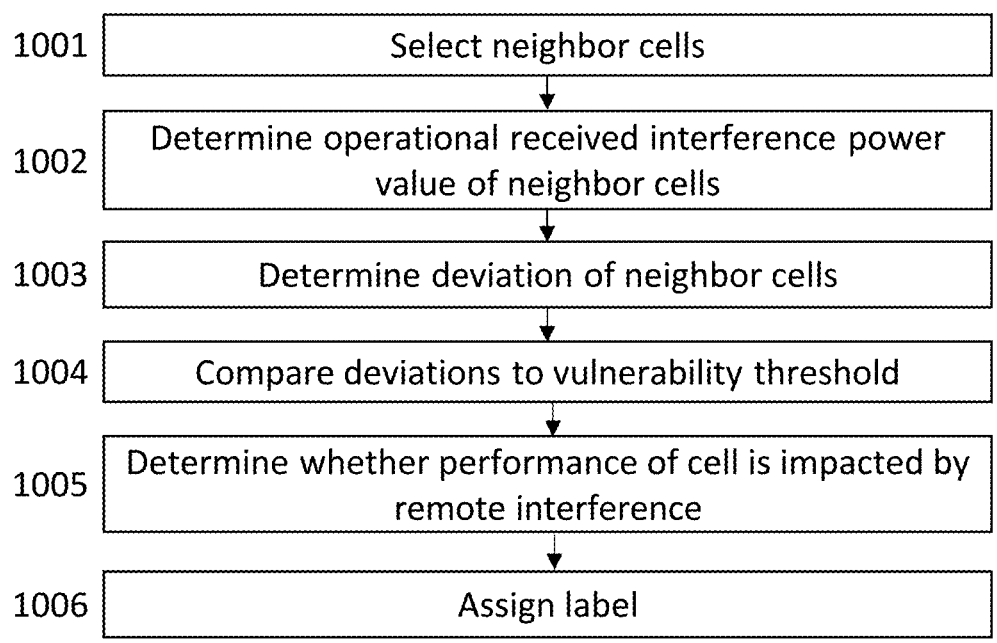
FIG. 10 illustrates a flow chart.

FIG. 10 illustrates a flow chart according to an example embodiment of a method for establishing spatial contextualization. The method of FIG. 10 may be performed in block 506 of FIG. 5. The method of FIG. 10 may be performed by an apparatus 1400 depicted in FIG. 14.

Referring to FIG. 10, in block 1001, one or more neighbor cells of the cell are selected from the plurality of cells based at least on a maximum distance from the cell, such that a distance between the cell and the one or more neighbor cells is below or equal to the maximum distance. For example, the neighbor cells above the maximum distance may first be filtered out, and then a pre-defined number of the closest neighbor cells within the maximum distance may be selected. As a non-limiting example, up to 10 neighbor cells within 8 miles (approximately 12.87 kilometers) from the cell may be selected.

The selection of the one or more neighbor cells may be based further on a similarity between an antenna azimuth direction of the cell and an antenna azimuth direction of the one or more neighbor cells. In other words, one or more neighbor cells (or neighbor base stations) with the same or a similar antenna azimuth direction as the original cell (or base station) may be selected. For instance, sector 1 in the original cell (or the base station controlling the cell) may be pointing at 0 degrees, while sector 1 in a neighbor cell (or neighbor base station) may be pointing at 15 degrees, but this neighbor cell may still be selected due to having a similar azimuth, despite not having the exact same azimuth. These sectors may then be compared with each other.

This selection may be done to establish spatial contextualization, i.e., to evaluate the cell against its neighbor cell(s) covering the same or similar direction. Normal (non-ducting) interference originates in localized areas (e.g., from a concentration of UEs) and arrives at nearby base stations from different directions. Remote interference caused by tropospheric ducting, on the other hand, arrives from a distant source, such as the aggressor base station 104, and arrives at multiple victim base stations 104B, 104C, 104D from a similar direction (see FIG. 3). This unique characteristic of tropospheric ducting can be exploited via spatial contextualization to more accurately determine if the interference is caused by tropospheric ducting.

The spatial contextualization may be used to confirm the origin of the remote interference. Tropospheric ducting events appear in areas larger than a single base station's coverage area (i.e., cell). Correlating interference of neighboring cells bring causation to the likely victims. Therefore, one or more neighboring cells within a pre-determined radius may be selected and filtered based on an azimuth pointing in the same or similar direction as the potential victim cell currently under analysis.

In block 1002, based on the radio measurement information (e.g., the set of received interference power values) of the one or more neighbor cells comprised in the training data, an operational received interference power value of (each of) the one or more neighbor cells is determined (e.g., by determining the measure of central tendency in a similar manner as explained above for FIG. 5 or FIG. 6). The set of received interference power values of a given neighbor cell may be averaged (e.g., on an hourly level), and then a measure of central tendency of all samples of that neighbor cell may be determined to indicate the normal interference for that neighbor cell.

In block 1003, based on additional radio measurement information of the one or more neighbor cells, a deviation of the one or more neighbor cells from the operational received interference power value of the one or more neighbor cells is determined (e.g., in a similar manner as described above for FIG. 5 or FIG. 7). In other words, the deviation of a given neighbor cell is calculated as a difference between the average of one or more new received interference power measurements of that neighbor cell, and the operational received interference power value of that neighbor cell (i.e., when new RIP measurements are received for a given neighbor cell, the average of the new RIP measurements are compared to the operational RIP value of that neighbor cell to determine the deviation).

If the one or more neighbor cells comprise more than one neighbor cell, then the deviation determined in block 1003 may comprise an average deviation of the neighbor cells. In other words, the deviation may be calculated individually for each cell, and then the average deviation may be calculated as an average of the individually calculated deviations.

In block 1004, the deviation of the cell and the deviation of (each of) the one or more neighbor cells are compared to the vulnerability threshold.

An offset may be applied to the vulnerability threshold for decreasing the vulnerability threshold for the one or more neighbor cells. In this case, the comparison of the deviation of (each of) the one or more neighbor cells may be done to the vulnerability threshold applied with the offset. In other words, the vulnerability threshold applied to the one or more neighbor cells may be smaller than the applied to the original cell. The one or more neighbor cells may comprise a variety of cells in different conditions, and therefore lowering the vulnerability threshold for the one or more neighbor cells may better reflect their interference situation.

In block 1005, based at least on the comparison, it is determined whether the performance of the cell is impacted by the remote interference caused by the tropospheric ducting.

In block 1006, the cell is assigned with a label from a plurality of pre-defined labels based at least on the comparison of the deviation of the cell to the vulnerability threshold, wherein the label indicates a probabilistic confidence of a level of the remote interference. The assigning of the label may be based further on the comparison of the deviation of (each of) the one or more neighbor cells to the vulnerability threshold.

For example, the plurality of pre-defined labels may comprise: a first label indicating that the performance of the cell is not impacted by the remote interference, based on the deviation of the cell not being above the vulnerability threshold; a second label indicating that the performance of the cell is likely impacted by the remote interference, based on the deviation of the cell being above the vulnerability threshold, and based on the deviation of the one or more neighbor cells not being above the vulnerability threshold; and a third label indicating that that the performance of the cell is confirmed to be impacted by the remote interference, based on the deviation of the cell being above the vulnerability threshold, and based on the deviation of the one or more neighbor cells being above the vulnerability threshold.

Out of all the likely victim cells (including the one or more neighbor cells), those with interference above the vulnerability threshold may be marked or labelled as confirmed victims (i.e., impacted by the remote interference).

Based on the assigned label, it may be determined whether to mitigate the remote interference in the cell.

Figure 11:
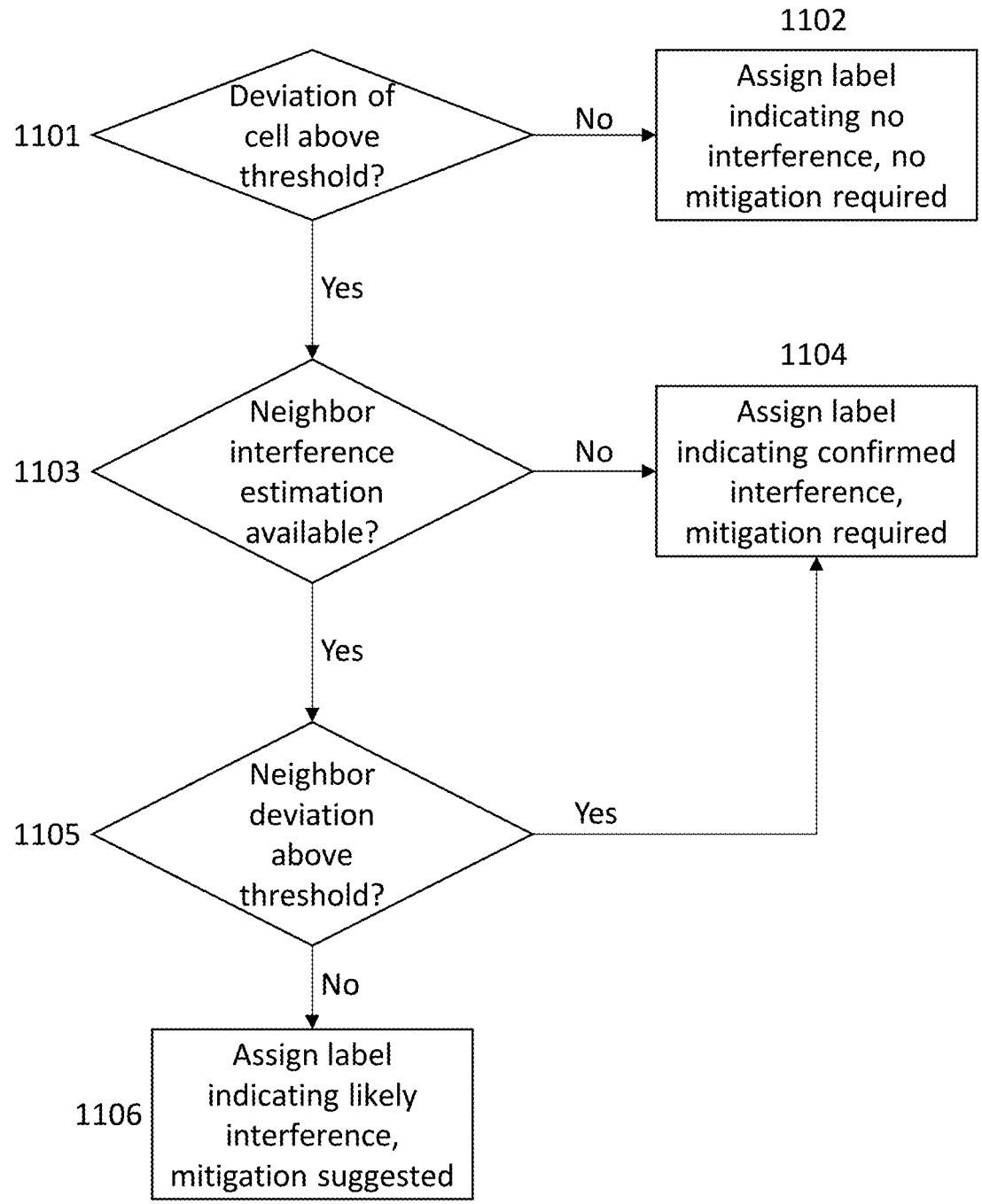
FIG. 11 illustrates a flow chart.

FIG. 11 illustrates a flow chart according to an example embodiment of a method for assigning the label in block 1006 of FIG. 10. The method of FIG. 11 may be performed by an apparatus 1400 depicted in FIG. 14.

Referring to FIG. 11, in block 1101, the deviation of the cell is compared to the vulnerability threshold to determine whether the deviation of the cell is above the vulnerability threshold.

In block 1102, based on determining that the deviation of the cell is not above the vulnerability threshold (block 1101: no), the cell is assigned with a label indicating that the performance of the cell is not impacted by the remote interference, and that no mitigation is required. Based on this label, the apparatus 1000 may determine to refrain from mitigating the remote interference in the cell.

Alternatively, in block 1103, based on determining that the deviation of the cell is not above the vulnerability threshold (block 1101: yes), it is determined whether the deviation of the one or more neighbor cells is available (i.e., whether an interference estimation of the one or more neighbor cells is available).

In block 1104, based on determining that the deviation of the cell is above the vulnerability threshold (block 1101: yes), and based on determining that the deviation of the one or more neighbor cells is not available (block 1103: no), the cell is assigned with a label indicating that the performance of the cell is confirmed to be impacted by the remote interference, and that mitigation is required. Based on this label, the apparatus 1400 may determine to mitigate the remote interference in the cell.

Alternatively, in block 1105, based on determining that the deviation of the one or more neighbor cells is available (block 1103: yes), it is determined whether the deviation of (each of) the one or more neighbor cells is above the vulnerability threshold. In other words, it is determined whether the one or more neighbor cells are impacted by the remote interference caused by the tropospheric ducting. In case the one or more neighbor cells comprise more than one neighbor cell, then the deviation used for the determination may comprise the average deviation of the neighbor cells.

In block 1105, based on determining that the deviation of the cell is above the vulnerability threshold (block 1101: yes), and based determining that the deviation of the one or more neighbor cells is not above the vulnerability threshold (block 1105: no), the cell is assigned with a label indicating that the performance of the cell is likely impacted by the remote interference, and that mitigation of the remote interference is suggested. Based on this label, the apparatus 1400 may determine to mitigate the remote interference in the cell.

Alternatively, in block 1104, based on determining that the deviation of the cell is above the vulnerability threshold (block 1101: yes), and based on determining that the deviation of the one or more neighbor cells is above the vulnerability threshold (block 1105: yes), the cell is assigned with a label indicating that the performance of the cell is confirmed to be impacted by the remote interference, and that mitigation is required. Based on this label, the apparatus 1400 may determine to mitigate the remote interference in the cell.

Figure 12:
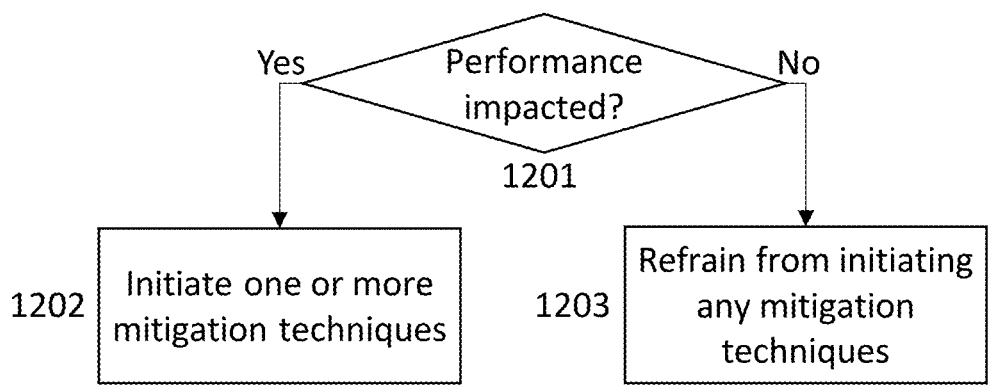
FIG. 12 illustrates a flow chart.

FIG. 12 illustrates a flow chart according to an example embodiment of a method for determining whether to mitigate the remote interference. The method of FIG. 12 may be performed following block 506 of FIG. 5 or block 1006 of FIG. 10. The method of FIG. 12 may be performed by an apparatus 1400 depicted in FIG. 14.

Referring to FIG. 12, in block 1201, it is determined whether the performance of the cell is impacted by the remote interference caused by the tropospheric ducting, and whether to mitigate the remote interference in the cell.

In block 1202, based at least on determining that the performance of the cell is impacted by the remote interference (block 1201: yes), one or more mitigation techniques are initiated in the cell for mitigating the remote interference. For example, the one or more mitigation techniques may comprise at least one of: muting (not transmitting) on some symbols or slots, reducing transmit power, or increasing downtilt.

In block 1203, based at least on determining that the performance of the cell is not impacted by the remote interference (block 1201: no), no mitigation techniques are initiated in the cell for mitigating the remote interference. In other words, in this case, the apparatus 1400 refrains from initiating any mitigation techniques in the cell for mitigating the remote interference.

Figure 13:
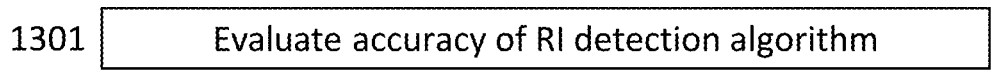
FIG. 13 illustrates a flow chart.

FIG. 13 illustrates a flow chart according to an example embodiment of a method for determining an accuracy of a remote interference detection algorithm of a base station. The method of FIG. 13 may be performed following block 506 of FIG. 5 or block 1006 of FIG. 10 (as an alternative or in addition to the method of FIG. 12). The method of FIG. 13 may be performed by an apparatus 1400 depicted in FIG. 14.

Referring to FIG. 13, in block 1301, based on the determination of whether the performance of the cell is impacted by the remote interference (e.g., in block 506), an accuracy of a remote interference detection algorithm of a base station controlling the cell is evaluated. The accuracy evaluation of block 1401 may be based on the label assigned at block 1006.

The remote interference detection algorithm of the base station refers to a different algorithm than the one used in block 506 to determine whether the performance of the cell is impacted by the remote interference caused by the tropospheric ducting. The accuracy evaluation may be beneficial for prompting further improvements in the base station metrics and/or in the remote interference detection algorithm to reach desired accuracy levels.

For example, confirmed and likely victim cells (or base stations) may be compared with the network's interference detection algorithm via a confusion matrix. Analysis of the detection algorithm allows to determine Feature accuracy and visualize Precision and Recall.

The Precision metric answers the question: When detection is true, was there a matching remote interference likely or confirmed?

The Recall metric answers the question: When remote interference is likely or confirmed, is detection true?

A final harmonic average between Precision and Recall may provide a single comparing value (e.g., called F1-score).

The blocks, related functions, and information exchanges (messages) described above by means of FIGS. 5 to 8 and 10 to 13 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 14:
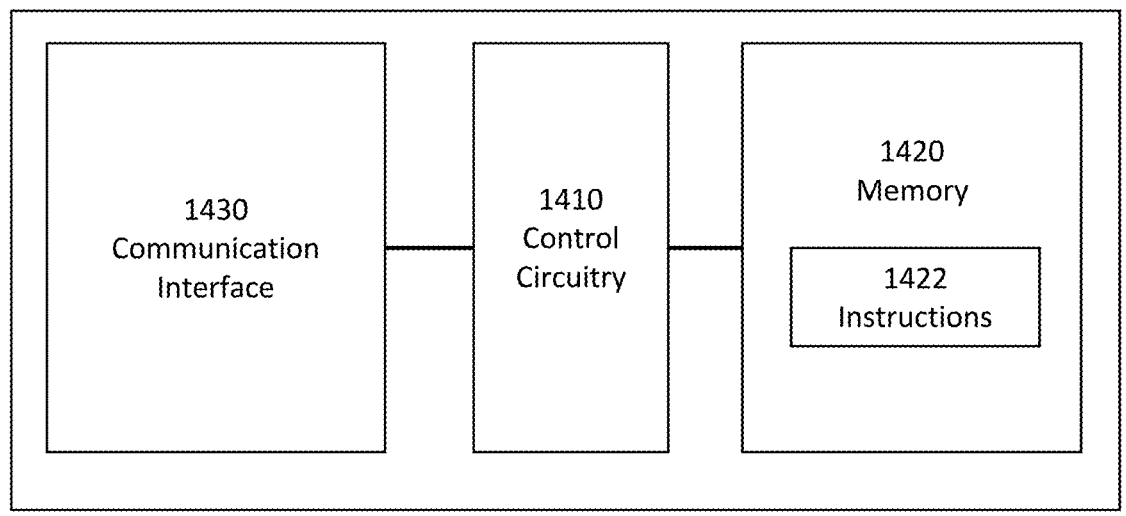
FIG. 14 illustrates an example of an apparatus.

FIG. 14 illustrates an example of an apparatus 1400 comprising means for performing one or more of the example embodiments described above (e.g., any of the methods of FIGS. 5 to 8 and 10 to 13). For example, the apparatus 1400 may be, or comprise, or be comprised in, a base station 104, 104B, 104C, 104D, or a near-real-time radio intelligent controller 210, or in a self-organizing network 112.

The apparatus 1400 may comprise, for example, a circuitry or a chipset applicable for realizing one or more of the example embodiments described above. The apparatus 1400 may be an electronic device or computing system comprising one or more electronic circuitries. The apparatus 1400 may comprise a control circuitry 1410 such as at least one processor, and at least one memory 1420 storing instructions 1422 which, when executed by the at least one processor, cause the apparatus 1400 to carry out one or more of the example embodiments described above. Such instructions 1422 may, for example, include computer program code (software). The at least one processor and the at least one memory storing the instructions may provide the means for providing or causing the performance of any of the methods and/or blocks described above.

In another embodiment, the means may be a network function of the core network, or the means may be network function virtualization infrastructure.

The processor is coupled to the memory 1420. The processor is configured to read and write data to and from the memory 1420. The memory 1420 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1420 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory.

The apparatus 1400 may further comprise or be connected to a communication interface 1430 comprising hardware and/or software for realizing communication connectivity according to one or more communication protocols. The communication interface 1430 may comprise at least one transmitter (Tx) and at least one receiver (Rx) that may be integrated to the apparatus 1400 or that the apparatus 1400 may be connected to. The communication interface 1430 may provide means for performing some of the blocks and/or functions (e.g., transmitting and receiving) for one or more example embodiments described above. The communication interface 1430 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1430 provides the apparatus with communication capabilities to communicate in the wireless communication network. The communication interface 1430 may, for example, provide a radio, cable or fiber interface to one or more base stations 104, 104B, 104C, 104D of a radio access network, and/or to a central entity such as an SMO 220.

It is to be noted that the apparatus 1400 may further comprise various components not illustrated in FIG. 14. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
   collect training data comprising radio measurement information and one or more performance metrics associated with a plurality of cells,
   wherein the radio measurement information comprises at least a set of received interference power values for each cell of the plurality of cells over a time window, and a set of signal-to-interference-plus-noise ratio levels for each cell of the plurality of cells over the time window;

determine an operational received interference power value per a cell of the plurality of cells by determining a measure of central tendency of the set of received interference power values of the cell;

determine a deviation value of the cell from the operational received interference power value, based on one or more new received interference power values of the cell that are measured after collecting the training data;

determine, based at least on the set of signal-to-interference-plus-noise ratio levels and the one or more performance metrics of the cell comprised in the training data, a vulnerability threshold above which a performance of the cell is impacted by remote interference caused by tropospheric ducting;

compare the deviation value of the cell to the vulnerability threshold; and determine, based at least on the comparison, whether the performance of the cell is impacted by the remote interference caused by the tropospheric ducting.

2. The apparatus of claim 1, caused to:
determine, based at least on the comparison, whether to mitigate the remote interference in the cell.

3. The apparatus of claim 1, caused to: based at least on determining that the performance of the cell is impacted by the remote interference, initiate one or more mitigation techniques in the cell for mitigating the remote interference.

4. The apparatus of claim 1, caused to: based at least on determining that the performance of the cell is not impacted by the remote interference, refrain from initiating any mitigation techniques in the cell for mitigating the remote interference.

5. The apparatus of claim 1, caused to: based on the determination of whether the performance of the cell is impacted by the remote interference, evaluate an accuracy of a remote interference detection algorithm of a base station controlling the cell.

6. The apparatus of claim 1, caused to: assign the cell with a label from a plurality of pre-defined labels based at least on the comparison of the deviation value of the cell to the vulnerability threshold, wherein the label indicates a probabilistic confidence of a level of the remote interference.

7. The apparatus of claim 6, caused to:
determine, based on the radio measurement information comprised in the training data, an operational received interference power value of one or more neighbor cells of the cell;

determine, based on additional radio measurement information of the one or more neighbor cells, a deviation value of the one or more neighbor cells from the operational received interference power value of the one or more neighbor cells; and compare the deviation value of the one or more neighbor cells to the vulnerability threshold, wherein the label is assigned based further on the comparison of the deviation value of the one or more neighbor cells to the vulnerability threshold.

8. The apparatus of claim 7, caused to:
apply an offset to the vulnerability threshold for decreasing the vulnerability threshold for the one or more neighbor cells, wherein the comparison of the deviation value of the one or more neighbor cells is done to the vulnerability threshold applied with the offset.

9. The apparatus of claim 7, caused to:
select the one or more neighbor cells from the plurality of cells based at least on a maximum distance from the cell, such that a distance between the cell and the one or more neighbor cells is below or equal to the maximum distance.

10. The apparatus of claim 9, wherein the selection of the one or more neighbor cells is based further on a similarity between an antenna azimuth direction of the cell and an antenna azimuth direction of the one or more neighbor cells.

11. The apparatus of claim 7, wherein the label indicates that the performance of the cell is likely impacted by the remote interference, based on the deviation value of the cell being above the vulnerability threshold, and based on the deviation value of the one or more neighbor cells not being above the vulnerability threshold.

12. The apparatus of claim 7, wherein the label indicates that the performance of the cell is confirmed to be impacted by the remote interference, based on the deviation value of the cell being above the vulnerability threshold, and based on the deviation value of the one or more neighbor cells being above the vulnerability threshold.

13. The apparatus of claim 6, wherein the label indicates that the performance of the cell is not impacted by the remote interference, based on the deviation value of the cell not being above the vulnerability threshold.

14. The apparatus of claim 1, wherein the determination of the deviation value of the cell comprises determining a difference between an average of the one or more new received interference power values of the cell, and the operational received interference power value of the cell.

15. The apparatus of claim 14, wherein the determination of the vulnerability threshold comprises:
determining an operational uplink vulnerability level of the cell by determining a measure of central tendency of the set of signal-to-interference-plus-noise ratio levels of the cell comprised in the training data;

generating a vulnerability mapping that indicates a relationship between the one or more performance metrics of the cell, the operational uplink vulnerability level of the cell, and the deviation value of the cell; and determining the vulnerability threshold based on the vulnerability mapping.

16. The apparatus of claim 14, wherein the time window comprises at least one week, and
wherein a granularity of the set of received interference power values and of the set of signal-to-interference-plus-noise ratio levels is equal to or smaller than one hour.

17. The apparatus of claim 1, wherein the one or more performance metrics comprise at least one of: a block error rate, a radio link failure rate, a random-access channel setup success ratio, an uplink data rate, an uplink spectral efficiency, or an uplink modulation coding scheme.

18. The apparatus of claim 1, wherein the plurality of cells are configured to apply time-division duplexing.

19. A method comprising:
collecting training data comprising radio measurement information and one or more performance metrics associated with a plurality of cells, wherein the radio measurement information comprises at least a set of received interference power values for each cell of the plurality of cells over a time window, and a set of signal-to-interference-plus-noise ratio levels for each cell of the plurality of cells over the time window;

determining an operational received interference power value per a cell of the plurality of cells by determining a measure of central tendency of the set of received interference power values of the cell;

determining a deviation value of the cell from the operational received interference power value, based on one or more new received interference power values of the cell that are measured after collecting the training data;

determining, based at least on the set of signal-to-interference-plus-noise ratio levels and the one or more performance metrics of the cell comprised in the training data, a vulnerability threshold above which a performance of the cell is impacted by remote interference caused by tropospheric ducting;

comparing the deviation value of the cell to the vulnerability threshold; and determining, based at least on the comparison, whether the performance of the cell is impacted by the remote interference caused by the tropospheric ducting.

20. A non-transitory computer readable medium comprising program instructions which, when executed by an apparatus, cause the apparatus to perform at least the following:

collecting training data comprising radio measurement information and one or more performance metrics associated with a plurality of cells, wherein the radio measurement information comprises at least a set of received interference power values for each cell of the plurality of cells over a time window, and a set of signal-to-interference-plus-noise ratio levels for each cell of the plurality of cells over the time window;

determining an operational received interference power value per a cell of the plurality of cells by determining a measure of central tendency of the set of received interference power values of the cell;

determining a deviation value of the cell from the operational received interference power value, based on one or more new received interference power values of the cell that are measured after collecting the training data;

determining, based at least on the set of signal-to-interference-plus-noise ratio levels and the one or more performance metrics of the cell comprised in the training data, a vulnerability threshold above which a performance of the cell is impacted by remote interference caused by tropospheric ducting;

comparing the deviation value of the cell to the vulnerability threshold; and determining, based at least on the comparison, whether the performance of the cell is impacted by the remote interference caused by the tropospheric ducting.

* * * * *